INVENTOR.
RUSSELL S. COLLEY
BY Dwight L. Moody
ATTY.

United States Patent Office 3,169,665
Patented Feb. 16, 1965

3,169,665
INFLATING APPARATUS
Russell S. Colley, Cuyahoga Falls, Ohio, assignor to The
B. F. Goodrich Company, New York, N.Y., a corporation of New York
Filed Aug. 1, 1962, Ser. No. 214,070
5 Claims. (Cl. 222—5)

The invention relates to inflating apparatus for inflatable articles and especially to inflating apparatus utilizing a cartridge of compressed gas as the inflating medium for articles such as inflatable life-saving vests or jackets, life rafts and the like.

Prior inflating apparatus have had a cartridge of compressed gas held in proximity to the piercing tip of a puncturing member which is actuated by an operating lever. Such inflating apparatus, when connected to fittings or inlet pipes on inflatable articles, seal the interior thereof and prevent accidental gas leakage therefrom. However, the connection is customarily made while the article is at ground level; hence a limited quantity of air is generally trapped and contained within the deflated article, because the inflating apparatus does not permit venting the air to the ambient atmosphere. This trapped air is subject to substantial expansion in volume, when the deflated article is transported to a high altitude where the ambient air pressure is relatively low. Such expansion of trapped air produces annoying, even dangerous bulging of the deflated article.

A principal object of the invention is to provide inflating apparatus capable of venting trapped air to the ambient atmosphere at all times except when in use with an inflated article.

Other objects of the invention are to provide for mechanically controlled opening and closing the venting passage in the inflating apparatus; to provide for maximum freedom of flow of trapped air from a deflated article to ambient atmosphere, and for effectively sealing against the escape of an inflating medium from an inflated article to ambient atmosphere; to provide for mounting and supporting a puncturing member at one end only thereof; to provide for positively actuating a puncturing member to three positions in a manner to vent air from the uninflated article, then to pierce the wall of a cartridge of compressed gas, while at the same time terminating the venting of air, and next producing a seal which prevents the escape of the gas to the ambient atmosphere; and to provide for simplicity of construction, convenience of manufacture and for effectiveness of operation.

These and other objects and advantages will be apparent from the following description.

In the accompanying drawings which form a part of this specification and in which like numerals are employed throughout to designate like parts:

Figure 1:
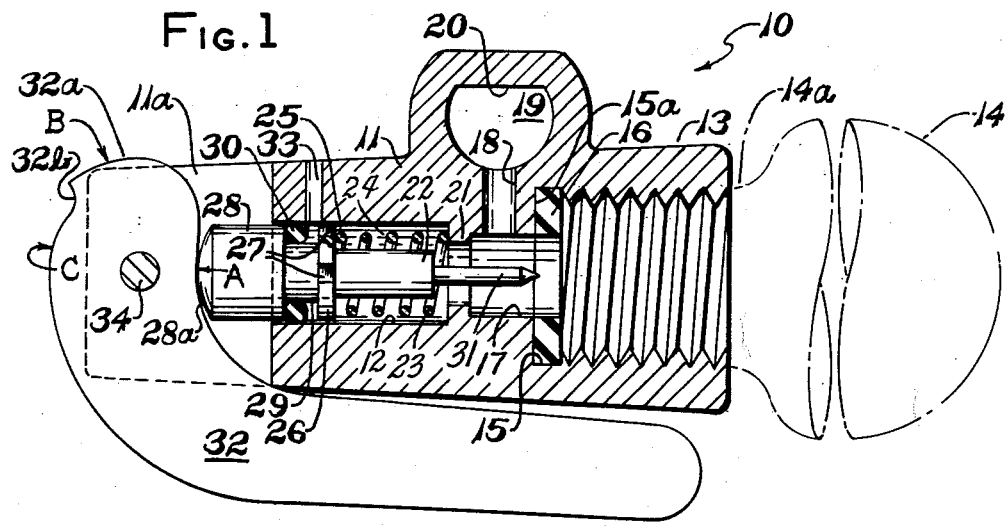
FIG. 1 is a longitudinal cross-sectional view of an inflating apparatus in condition for venting and constructed in accordance with and embodying the invention.

The inflating apparatus 10 includes a hollow body or housing 11 of aluminum or other suitable metal with a central axial or longitudinally extending bore or opening 12 therethrough. The hollow housing 11 has a tubular end portion 13 which is internally threaded to engage the external threads on neck 14a of a cartridge 14 containing a compressed gas such, for example, as pressurized carbon dioxide gas, the cartridge being shown in broken lines. The housing 11 provides an annular shoulder 15a at the inner end of its threaded end portion 13 and a recess 15 in which is disposed a flat, annular elastomeric gasket 16 of neoprene, nylon, natural or synthetic rubber, or other suitable resilient material abutting the shoulder 15a. When the cartridge 14 is screwed into the housing 10, the end wall of the cartridge seats against the gasket 16 in sealing relation thereto.

The central bore 12 has an inlet or inner end portion 17 aligned with the opening in the gasket 16 and arranged in communication with a gas-conducting passage 18 which extends laterally or transversely of the housing 11 to a combined outlet and mounting opening 19 therein adapted to receive and slip over an inlet pipe of an inflatable article such as a life-saving vest or jacket of impervious flexible material. The outlet and mounting opening 19 has desirably a flattened surface 20 for engaging a flattened side wall of the inlet pipe. The structural details of the inlet pipe and its attachment to the life-saving vest are well known; hence the said inlet pipe and attachment has not been shown in the drawings.

The central bore 12 has adjacent the lateral passage 18 a radially inwardly extending shoulder or wall portion 21 which constitutes an annular abutment for engaging one end 23 of a coiled metal compression spring 24 which is arranged about an integral puncturing member 22 of steel or other suitable hard metal. There is substantial clearance or radial space between the abutment 21 and the puncturing member 22 to permit venting air to flow through the bore 12. The other end 25 of the spring 24 abuts against or engages an enlarged diameter venting portion 26 of the puncturing member, whereby the spring 24 continuously exerts force on the member 22 in the direction away from the container 14. The venting portion 26 is in close fitting, slidable relation to the adjacent cylindrical wall in the central bore 12. There are three circumferentially and equally spaced-apart venting grooves 27 of arcuate configuration each extending longitudinally or axially in the radially outer peripheral surface of the portion 26.

The integral puncturing member 22 includes a cylindrical actuating or outer end portion 28 spaced longitudinally from the venting portion 26 to provide an annular recess or space to receive a sealing means or O-ring sealing element 30. The actuating or outer end portion 28 has a cylindrical part of greater axial length than the venting portion 26 but of the same outside diameter as the venting portion 26, so as to be in said slidable relation to the said adjacent cylindrical wall in the bore 12 and so as to support the member 22 for longitudinal movement in the bore. A cylindrical portion 29 of reduced diameter interconnects the venting portion 26 and the actuating end portion 28 of the puncturing member, and not only supports the sealing element but is of sufficient axial length to permit limited axial rolling of the O-ring sealing element 30, when the puncturing member 22 is moved axially or longitudinally in either direction. The construction and arrangement of these portions 26, 28 and 29 at the outer end region of the puncturing member 22 assures supporting and maintaining said member radially centered in the bore 12 at all times and prevents axial tilting of the member during its axial movement to the three different positions shown in FIGS. 1, 2 and 3, so that the member 22 does not contact nor bind against the abutment 21.

The O-ring sealing element is made of neoprene, natural or synthetic rubber, or other resilient elastomeric material and has "as molded" or otherwise formed, an initially circular shape in cross-section. It is normally slightly compressed or resiliently deformed laterally to a rounded non-circular shape in cross-section as shown, whereby to contact the cylindrical wall in the bore 12 and the interconnecting cylindrical portion 29 of the puncturing member 22 in sealing relation thereto.

The integral puncturing member 22 also includes at its inner end a cylindrical piercer portion 31 of reduced diameter having a sharp pointed tip for puncturing the end wall of the cartridge 14 to release the compressed gas. Thus, the portions 28, 26 and 31 of the member are connected with the diameter of the member 22 other than the actuating end portion 28 being less than that of the bore 12 and the shoulder 21.

The actuating or outer end portion 28 including its rounded end surface 28a functions as a spring-urged "follower" of the puncturing member 22 to engage a concavo-convexly curved edge or camming surface 32a of a flat operating lever 32. The operating lever 32 of suitable hard metal is pivotally mounted in a slotted end portion 11a of the housing 11 by a pin 34 extending through aligned openings in the housing, the operating space provided by the slotted construction accommodating the cylindrical outer end portion 28 and the lever 32. The concavo-convexly curved camming surface 32a with a concave indent portion at 32b for temporary locking against the rounded end of portion 28, has provision for disposing and temporarily retaining the puncturing member 22 at three different axial positions, namely, fully retracted with venting (FIG. 1), advanced or puncturing with non-venting (FIG. 2), and partially retracted with non-venting (FIG. 3).

The concave portion of the camming surface 32a at the region thereon indicated by "A" provides minimum radial distance from the axis of the pin 34 so that puncturing member 22 can be disposed at its fully retracted position. The concave portion merges with a relatively sharply curved convex portion of the camming surface at the region thereon indicated by "B," which convex portion intersects the concave indent 32b and provides maximum radial distance from the axis of the pin 34 so that the puncturing member 22 can be disposed at its advanced or puncturing position. The other or second convex portion of the camming surface 32a which merges with the concave indent 32b is of lesser sharpness of curvature at the region indicated by "C" than the convex portion at region "B" and provides a radial distance from the axis of the pin 34 greater than that at region "A" but less than that at region "B" so that the puncturing member 22 can be disposed at its partially retracted position.

When the puncturing member 22 is in its fully retracted position with radial clearance between the abutment 21 and the member 22 and with the rounded end surface 28a of the "follower" or outer end portion 28 in contact with the concave portion at region "A" of the lever camming surface 32a as shown in FIG. 1, the interior of the deflated life-saving vest can be placed in free or venting communication with the ambient atmosphere by means of laterally-extending venting means 33 which may be a single venting passage 33 in the housing 11. The venting passage 33 is located adjacent but slightly spaced inwardly from the slotted end portion 11a of the housing 11 and thereby is in communication with the annular space between the venting (26) and outer end (28) portions of the puncturing member 22 and is unobstructed by the O-ring sealing element 30, when said puncturing member 22 is resiliently maintained in its fully retracted position by the compression spring 24. Thus, air trapped within the deflated life-saving vest can escape to the outlet opening 19 in the housing 11 and then flow through the lateral passage 18 to the inlet portion 17 of the central bore 12. It flows rearwardly from portion 17 through the radial clearance space at wall portion 21 and along the bore 12 to the venting grooves 27, 27 and then into the said annular space at the outer end region of the bore 12, which space is sealed off by the sealing element 30. This air next flows out through the venting passage 33 to the ambient atmosphere. By virtue of such venting, the pressure of residual air contained within the deflated life-saving vest will correspond to substantially the pressure of the ambient atmosphere, regardless of altitude, so that there is little or no expansion of trapped air and little or no annoying bulging of the vest.

Figure 2:
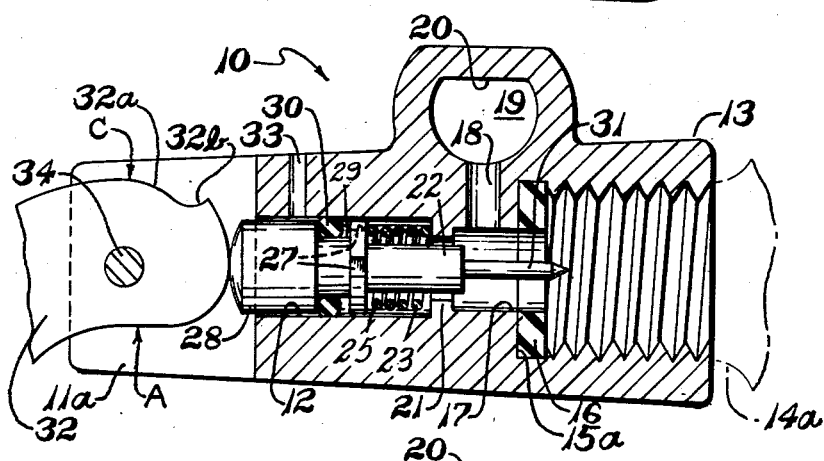
FIG. 2 is a cross-sectional view like FIG. 1 but showing a puncturing member advanced to its non-venting cartridge-piercing position.
Figure 3:
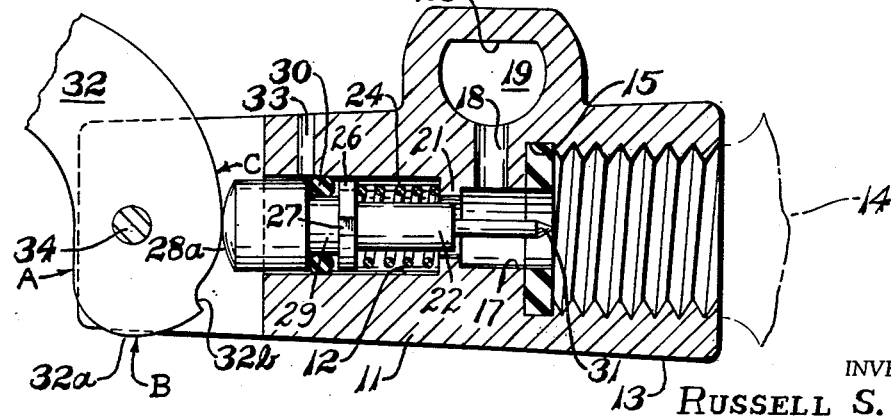
FIG. 3 is a cross-sectional view like FIG. 1 but showing the puncturing member retracted to an intermediate non-venting position.

The operator terminates venting the trapped air from the life-saving vest by compelling axial sliding movement of the puncturing member 22 from its fully retracted position, shown in FIG. 1, to its advanced or puncturing position, shown in FIG. 2. This is accomplished by swinging the operating lever 32 about the pin 34 until the sharply curved convex portion at region "B" of the camming surface 32a contacts the rounded end surface 28a of the outer end portion 28 of the puncturing member, the coiled spring 34 then being in its fully compressed or axially shortened condition. When the operating lever 32 and the puncturing member 22 are in the relationship shown in FIG. 2, the outer end portion 28 and sealing element 30 have closed venting passage 33, and the piercer portion 31 has completely punctured the end wall of the cartridge 14 but still restricts or plugs the resultant opening thereby resisting rapid release of the compressed gas in the cartridge.

The puncturing member 22, during the early phase of its travel toward the cartridge 14, compels axial rolling movement of the slightly compressed O-ring sealing element 30 from its position at the outer side of the venting passage 33 to a position beyond the inner side of the venting passage 33, thereby effectively sealing the central bore 12 against loss of compressed gas. It is essential that this closing of the venting passage 33 occur before the piercer portion 31 has completely punctured the end wall of the cartridge 14.

Continued restriction of the resultant opening in the end wall of the cartridge by the piercer portion 31 is eliminated by swinging or pivoting the operating lever 32 about the pin 34 until the outer end portion 28 of the puncturing member contacts the second convex portion at region "C" of the camming surface 32a so that the piercer portion 31 is substantially fully withdrawn from the opening in the cartridge, as shown in FIG. 3. The concave indent 32b of the camming surface 32a will engage outer end portion 28 and thereby prevent accidental pivotal movement of the operating lever 32 in the reverse direction after the puncturing member 22 is positioned at the said second convex portion.

The axial force exerted by the compression spring 24 resiliently maintains the outer end portion 28 of the puncturing member in continuous contact with the camming surface 32a of the operating lever from the first convex portion at region "B" to the second convex portion at region "C." Thus, the puncturing member 22 is compelled to move or travel axially in the direction away from the cartridge 14 to the partially retracted position shown in FIG. 3, where the O-ring sealing element 30 provides an air- and gas-tight seal in the central bore 12 at the inner side of venting passage 33 and the pointed tip of the piercer portion 31 of the puncturing member is substantially fully withdrawn from the opening in the cartridge 14.

The contained compressed gas then flows rapidly from the cartridge 14 through the inlet portion 17, the lateral passage 18, the outlet opening 19 and then into the chamber or chambers of the life-saving vest where the gas expands and inflatably distends the vest. Little or no expanded gas in the inflated vest leaks through the inflating apparatus since the resilient gasket 16 provides an effective seal against the end wall of the cartridge 14, while the O-ring sealing element 30 provides an effective seal in the central bore 12 at a position in advance of the venting passage 33.

Variations may be made without departing from the

I claim:

1. Inflating apparatus for attachment to an inlet of an inflatable article, said inflating apparatus comprising
   (a) a hollow housing having a bore extending longitudinally therethrough which terminates at its inner end in a tubular end portion adapted to receive a compressed gas cartridge and which terminates at its outer end in a slotted end portion,
   (b) said housing having adjacent the inner end of said bore a gas-conducting passage extending laterally from said bore to an outlet opening in said housing for receiving the inlet of the inflatable article,
   (c) a venting passage spaced inwardly from the outer end of said bore and extending laterally from said bore to the outer surface of said housing for communication with the ambient atmosphere,
   (d) a puncturing member longitudinally movable within said bore for disposition sequentially at a venting position, a puncturing position, and a partially retracted position, said puncturing member including an actuating end portion connected to a piercer portion with the diameter of said member other than the said actuating end portion being less than that of said bore, and
   (e) a sealing means intermediate said piercer and actuating portions in sealing cooperation with said bore and member and positionable outwardly of said venting passage, when said member is in the venting position, to permit communication through said bore, of said gas-conducting passage and said venting passage, and positionable intermediate the said passages to seal said venting passage from said gas-conducting passage, when said member is in either the puncturing position or the partially retracted position.

2. An inflating apparatus as defined in claim 1 wherein said actuating end portion includes a cylindrical part having a sliding fit in said bore with the longitudinal extent of said cylindrical part sufficient to support said member for longitudinal movement in the said bore.

3. An inflating apparatus as defined in claim 1 wherein said puncturing member includes a venting portion spaced inwardly from said actuating end portion with a connecting portion of reduced diameter extending therebetween, the said sealing means being supported by said connecting portion in the space between the venting and actuating end portions, said venting portion having a sliding fit in said bore and a longitudinal extent less than that of said actuating end portion and having spaced longitudinal venting grooves therethrough to permit communication through said bore with said venting passage, when said member is in the said venting position.

4. Inflating apparatus for attachment to an inlet of an inflatable article, said inflating apparatus comprising
   (a) a hollow housing having a bore extending longitudinally therethrough which terminates at its inner end in a tubular end portion adapted to receive a compressed gas cartridge and which terminates at its outer end in a slotted end portion,
   (b) said housing having adjacent the inner end of said bore a gas-conducting passage extending laterally from said bore to an outlet opening in said housing for receiving the inlet of the inflatable article,
   (c) a venting passage spaced inwardly from the outer end of said bore and extending laterally from said bore to the outer surface of said housing for communication with the ambient atmosphere,
   (d) a radially inwardly extending shoulder in said bore intermediate said passages providing an annular abutment,
   (e) a puncturing member longitudinally movable within said bore for disposition sequentially at a venting position, a puncturing position, and a partially retracted position, said puncturing member including an actuating end portion connected to a piercer portion with the diameter of said member other than the said actuating end portion being less than that of said bore and of said shoulder,
   (f) compression spring means disposed in said bore intermediate said actuating end portion and said abutment and engaging said member and said abutment,
   (g) a sealing means intermediate said piercer and actuating end portions in sealing cooperation with said bore and member and positionable outwardly of said venting passage, when said member is in the venting position, to permit communication through said bore, of said gas-conducting passage and said venting passage, and positionable intermediate the said passages to seal the said venting passages from said gas-conducting passage, when said member is in either the puncturing position or the partially retracted position, and
   (h) an operating lever pivotally mounted in said slotted end portion of the housing and having a concavo-convexly curved camming surface including a concave locking indent portion contacting a rounded end surface of said actuating end portion for moving the puncturing member longitudinally, despite the resistance of the spring means, from the venting position to the puncturing position and then to the partially retracted position.

5. Inflating apparatus for attachment to an inlet of an inflatable article, said inflating apparatus comprising
   (a) a hollow housing having a bore extending longitudinally therethrough which terminates at its inner end in a tubular end portion adapted to receive a compressed gas cartridge and which terminates at its outer end in a slotted end portion,
   (b) said housing having adjacent the inner end of said bore a gas-conducting passage extending laterally from said bore to an outlet opening in said housing for receiving the inlet of the inflatable article,
   (c) a venting passage spaced inwardly from the outer end of said bore and extending laterally from said bore to the outer surface of said housing for communication with the ambient atmosphere,
   (d) a radially inwardly extending shoulder in said bore intermediate said passages providing an annular abutment,
   (e) a puncturing member longitudinally movable within said bore for disposition sequentially at a venting position, a puncturing position, and a partially retracted position, said puncturing member including a cylindrical actuating end portion and a venting portion in spaced relationship connected to a sharp pointed piercer portion with the diameter of said member other than the said actuating end portion and venting portion being less than that of said bore and of said shoulder, said venting portion having longitudinal venting grooves in its outer periphery,
   (f) a coiled compression spring disposed concentrically about said member with the ends of the spring contacting said venting portion and said abutment,
   (g) an O-ring sealing element of resilient material intermediate said venting and actuating end portions in sealing cooperation with said bore and member and positionable outwardly of said venting passage, when said member is in the venting position, to permit communication through said bore, of said gas-conducting passage and said venting passage, and positionable intermediate the said passages to seal the said venting passage from said gas-conducting passage, when said member is in either the puncturing position or the partially retracted position, and
   (h) an operating lever pivotally mounted in said slotted end portion of the housing and having a concavo-convexly curved camming surface including a concave locking indent portion contacting a rounded end surface of said actuating end portion for moving the puncturing member lonigtudinally, despite the resilient resistance of said compression spring, from the venting position to the puncturing position and then to the partially retracted position.

References Cited by the Examiner
UNITED STATES PATENTS

| | | | |
|---|---|---|---|
| 1,490,227 | 4/24 | Osborn | 137—625.26 |
| 2,733,835 | 2/56 | Alfery et al. | 137—625.26 X |
| 3,023,932 | 3/62 | Hennis et al. | 222—5 |

RAPHAEL M. LUPO, *Primary Examiner.*

LOUIS J. DEMBO, *Examiner.*